United States Patent [19]

Hess et al.

[11] 3,907,767

[45] Sept. 23, 1975

[54] 1-PHENYL-3-HYDROXY-3-METHYL-TRIAZENES

[75] Inventors: Friedrich Karl Hess, Hudson; Patrick Bryan Stewart, St. Andrews East; Genus Possanza, Dorval; Kurt Freter, Beaconsfield, all of Canada

[73] Assignee: Boehringer Ingelheim GmbH, Ingelheim am Rhein, Germany

[22] Filed: Jan. 12, 1973

[21] Appl. No.: 323,071

[30] Foreign Application Priority Data
Feb. 23, 1972 Germany............................ 2208368

[52] U.S. Cl.......... 260/140; 260/471 R; 260/558 A; 260/999; 424/226
[51] Int. Cl.²................ A61K 31/655; C07C 115/00
[58] Field of Search..................... 260/140; 424/226

[56] References Cited
UNITED STATES PATENTS
3,714,351   1/1973   Gubler................................ 424/226

OTHER PUBLICATIONS
Dugar et al., Chemical Abstracts, Vol. 65, 5385e, (1966).
Gebhard et al., Chemical Abstracts, Vol. 3, pp. 2962–2963, (1909).
Gubler, Chemical Abstracts, Vol. 73, p. 301, No. 130181c, (1970).
Gubler, Chemical Abstracts, Vol. 74, p. 252, No. 52489p, (1971).
Purohit et al., Chemical Abstracts, Vol. 64, 4904–4905, (1966).
Purohit et al., Z. Naturforsch, Vol. 20, pp. 853–855, (1965).

Primary Examiner—Floyd D. Higel
Attorney, Agent, or Firm—Hammond & Littell

[57] ABSTRACT

Compounds of the formula

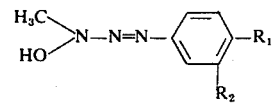

wherein
$R_1$ is carbamoyl, N-lower alkyl-carbamoyl, lower alkoxy-carbonyl, phenyl, or cyano, and
$R_2$ is hydrogen or methyl;
the compounds are useful as immunosuppressants.

5 Claims, No Drawings

1-PHENYL-3-HYDROXY-3-METHYL-TRIAZENES

THE PRIOR ART

German Offenlegungsschrift No. 2,003,333 discloses a class of 1-phenyl-3-hydroxy-3-alkyl-triazenes as active ingredients in insecticidal and acaricidal compositions.

This invention relates to novel 1-phenyl-3-hydroxy-3-methyl-triazenes, as well as to a process of preparing these compounds.

More particularly, the present invention relates to a novel class of compounds of the formula

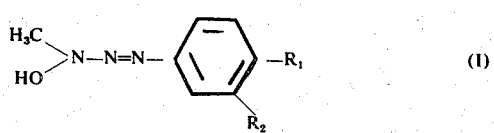

wherein $R_1$ is carbamoyl, N-lower alkyl-carbamoyl, lower alkoxy-carbonyl, phenyl, or cyano, and $R_2$ is hydrogen or methyl.

A preferred sub-genus thereunder is constituted by compounds of the formula I wherein $R_1$ has the meanings above defined, except phenyl, and $R_2$ is hydrogen or methyl.

The compounds embraced by formula I may be prepared by diazotizing a compound of the formula

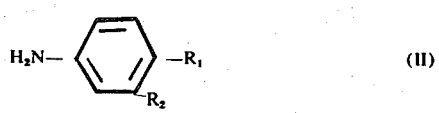

wherein $R_1$ and $R_2$ have the same meanings as in formula I, and reacting the diazo compound thus obtained with N-methyl-hydroxylamine or a salt thereof.

The diazotization of a compound of the formula II is performed in the conventional way by dissolving or suspending the compound in water, treating the aqueous mixture with an excess of a concentrated mineral acid, such as hydrochloric acid, and adding sodium nitrite, while cooling. After the diazotization is completed, the diazonium salt solution thus obtained is slowly poured portionwise into an aqueous N-methyl-hydroxylamine hydrochloride solution which has been buffered to a pH of about 6, and cooled to a temperature between 0° and +10°C., while stirring vigorously. Stirring is continued for a while, and the final product that results is processed in the usual way.

The anilines of the formula II used as starting materials may be obtained, for example, by chemical or catalytic reduction of the corresponding p-nitro-compounds, such as by means of nascent hydrogen generated by a mixture of iron filings and an aqueous mineral acid, or by means of $PtO_2$ in ethanol.

The following examples further illustrate the present invention and will enable others skilled in the art to understand it more completely. It should be understood, however, that the invention is not limited solely to the particular examples given below.

EXAMPLE 1

1-[p-(N-isopropyl-carbamoyl)-phenyl]-3-hydroxy-3-methyl-triazene

A suspension of 10 gm of p-(N-isopropyl-carbamoyl)-aniline in 100 ml of water was cooled to 10°C., and 12 ml of concentrated hydrochloric acid were added thereto. The resulting solution was cooled to between 0° and 5°C., and at this temperature 4.8 gm of sodium nitrite were added slowly. Subsequently, the resulting diazonium salt solution at a temperature between 0° and 10°C. was stirred portionwise into a solution of 6.7 gm of N-methyl-hydroxylamine hydrochloride in 100 ml of water, which had been buffered with a 10 percent sodium acetate solution to a pH of 6. The pH was kept constant by further addition of sodium acetate solution, and the reaction solution was stirred for 1 hour more at approximately 5°C. The precipitate formed thereby was collected by vacuum filtration, washed, dried and purified by recrystallization from acetonitrile, yielding 6.2 gm (39 percent of theory) of the compound of the formula

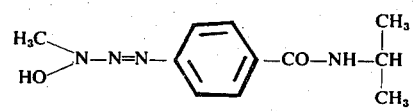

which had a melting point of 212° – 213°C.

EXAMPLE 2

1-[p-(N-n-propyl-carbamoyl)-phenyl]-3-hydroxy-3-methyl-triazene

A mixture consisting of 15 gm of p-(N-n-propyl-carbamoyl)-aniline and 130 ml of water was cooled to 10°C., and then stirred into 16 ml of concentrated hydrochloric acid. The resulting solution was cooled to 0°C. and admixed portionwise with 6 gm of sodium nitrite. The diazonium salt solution thus obtained was stirred portionwise into a solution of 8.4 gm of N-methyl-hydroxylamine hydrochloride in 125 ml of water (buffered to an approximate pH of 6 with a 10 percent sodium acetate solution); when required, more sodium acetate solution was added for maintaining this pH-value. The reaction mixture was stirred for 1 hour at approximately 5°C., and the precipitate was collected by vacuum filtration, washed, dried and recrystallized from acetonitrile, yielding 11.2 gm (56.0 percent of theory) of the compound of the formula

which had a melting point of 209° – 210°C.

EXAMPLE 3

1-(p-Cyano-phenyl)-3-hydroxy-3-methyl-triazene 59 gm (0.5 mol) of 4-amino-benzonitrile were stirred into 1 liter of water at room temperature. This resulting suspension was cooled to 0° to 5°C., and then 100 ml of concentrated hydrochloric acid were added dropwise thereto, and then 34.5 gm of sodium nitrite in 100 ml of water were added dropwise thereto. The resulting diazonium salt solution was poured into a cold solution of 55 gm (0.66 mol) of N-methyl-hydroxylamine hydrochloride in 1 liter of water, and a pH-value of 6 to 7 was maintained by adding saturated sodium carbonate solution. The precipitated crystals were filtered off, dissolved in chloroform, the solution was dried over anhydrous sodium sulfate, and the chloroform was evaporated. The residue was recrystallized from chloroform/ether, yielding 40.5 gm (46 percent of theory) of the compound of the formula

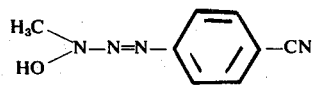

which had a melting point of 190°– 192°C.

EXAMPLE 4

1-(p-Biphenylyl)-3-hydroxy-3-methyl-triazene 50.0 gm (0.296 mol) of 4-amino-biphenyl were added at room temperature to 600 ml of water in a 2-liter beaker while stirring. The resulting suspension was cooled to 5°C., acidified with 60 ml of concentrated (38 percent) hydrochloric acid, and the resulting clear solution was then admixed with a solution of 20 gm (0.29 mol) of sodium nitrite in 50 ml of water. The resulting diazonium salt solution was poured into a cold solution of 33 gm (0.40 mol) of N-methyl-hydroxylamine hydrochloride in 600 ml of water, while maintaining a pH of 6 – 7 by the addition of a saturated aqueous sodium carbonate solution. The product was filtered off, dissolved in chloroform, and the chloroform solution was dried over sodium sulfate and evaporated in vacuo to dryness. The raw product was recrystallized 3 times from chloroform ether, yielding 38.3 gm (57 percent of theory) of the compound of the formula

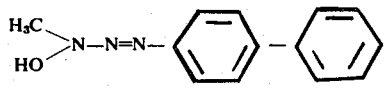

which had a melting point of 162° – 163°C.

EXAMPLE 5

Utilizing a procedure analogous to that described in Example 1, 1-[p-(N-isobutyl-carbamoyl)-phenyl]-3-hydroxy-3-methyl-triazine of the formula

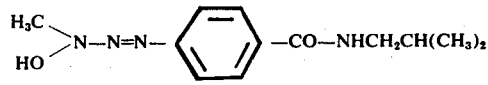

which had a melting point of 189° – 190°C., was prepared from p-(N-isobutylcarbamoyl)-aniline and N-methyl-hydroxylamine hydrochloride.

EXAMPLE 6

Utilizing a procedure analogous to that described in Example 1, 1-[p-(ethoxy-carbonyl)-phenyl]-3-hydroxy-3-methyl-triazine of the formula

which had a melting point of 144° – 146°C., was prepared from p-(ethoxy-carbonyl)-aniline and N-methyl-hydroxylamine hydrochloride.

EXAMPLE 7

Utilizing a procedure analogous to that described in Example 1, 1-[m-methyl-p-carbamoyl-phenyl]-3-hydroxy-3-methyl-triazine of the formula

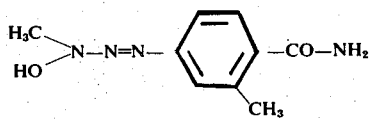

which had a melting point of 213°C., was prepared from m-methyl-p-carbamoyl-aniline and N-methyl-hydroxylamine hydrochloride.

EXAMPLE 8

Utilizing a procedure analogous to that described in Example 1, 1-[p-carbamoyl-phenyl]-3-hydroxy-3-methyl-triazene of the formula

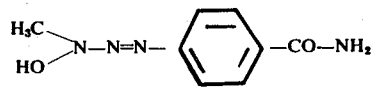

which had a melting point of 205° – 206°C. was prepared from p-carbamoyl-aniline and N-methyl-hydroxylamine hydrochloride.

The compounds according to the present invention, that is, those embraced by formula I above, have useful pharmacodynamic properties. More particularly, the compounds of the instant invention exhibit immunosuppressant activities in warm-blooded animals, such as sheep, mice and rats.

Particularly preferred are those compounds of the formula I wherein $R_1$ is carbamoyl, N-lower alkyl-carbamoyl, lower alkoxy-carbonyl or cyano, and $R_2$ is hydrogen or methyl.

For example, in the so-called PFC-test (Plaques Forming Cell Test) according to Jerne, Nordin and Henry [see B. Amos and H. Koprowski "Cell Bound Antibodies" page 109; Wistar Institute Press, Philadelphia (1963)], the daily administration of 150 mg/kg i.p. or 200 mg/kg p.o., respectively, of 1-[p-(N-isopropyl-carbamoyl)-phenyl]-3-hydroxy-3-methyl-triazene produced a practically complete suppression (96.6 percent and 96.0 percent, respectively) of the immunity provoked by erythrocytes in sheep. Heretofore, an immunosuppression of this degree could only be produced by antilymphocyte serum or by large doses of procarbazine [N-isopropyl-α-(2-methyl-hydrazino)-p-toluamide], whereby, however, strong side-effects are produced which were not observed in the present case.

In the polyarthritis test performed analogous to the method of B. B. Newbould, Brit. J. Pharmacol., 24, 632 (1964) in rats, an oral dose of 200 mg/kg (3 days) and 100 mg/kg (11 days), respectively, of 1-[p-(N-isopropyl-carbamoyl)-phenyl]-3-hydroxy-3-methyl-triazene produced an inhibition of the swelling of the injected and the uninjected paw of 58.7 percent and 83.3 percent, respectively.

In the skin transplant test (dosing of the above-mentioned compound 100 mg/kg i.p. from day −4 to day +3 and 50 mg/kg i.p. from day +4 to day +13) in mice, the time of survival of the transplantation amounted to 21.1 days, while in the untreated controls the time of transplant survival was only 12.6 days.

The median lethal dose ($LD_{50}$) of 1-[p-(N-isopropyl-carbamoyl)-phenyl]-3-hydroxy-3-methyl-triazene in mice is far greater than 1000 mgm/kg p.o.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. The effective daily dose rate of the compounds according to the present invention is from 0.83 to 5 mgm/kg body weight, and may be administered in 1 to 4 single doses.

The following examples illustrate a few dosage unit compositions comprising a compound of the present invention as an active ingredient and represent the best modes contemplated of putting the invention into practical use. The parts are parts by weight unless otherwise specified.

EXAMPLE 9

Coated Tablets

The tablet core composition was compounded from the following ingredients:

| | |
|---|---|
| 1-[p-(N-isopropyl-carbamoyl)-phenyl]-3-hydroxy-3-methyl-triazene | 100.0 parts |
| Lactose | 60.0 parts |
| Corn starch | 35.0 parts |
| Gelatin | 3.0 parts |
| Magnesium stearate | 2.0 parts |
| Total | 200.0 parts |

Preparation:

A mixture of the active ingredient, the lactose and the corn starch was granulated with an aqueous 10 percent solution of the gelatin through a 1 mm-mesh screen, and the granulate was dried at 40°C. and again passed through the screen. The dry granulate thus obtained was admixed with the magnesium stearate, and the resulting composition was compressed into 200 mgm-tablet cores which were coated in the usual manner with a thin shell consisting essentially of a mixture of sugar, titanium dioxide, talcum and gum arabic. The coated tablets were then polished with beeswax. Each coated tablet contained 100 mgm of the 1-phenyl-3-hydroxy-3-methyl-triazene compound and was an oral dosage unit composition with effective immunosuppressant activity.

EXAMPLE 10

The tablet composition was compounded from the following ingredients:

| | |
|---|---|
| 1-[p-(N-isopropyl-carbamoyl)-phenyl]-3-hydroxy-3-methyl-triazene | 100.0 parts |
| Lactose | 70.0 parts |
| Corn starch | 50.0 parts |
| Soluble starch | 7.0 parts |
| Magnesium stearate | 3.0 parts |
| Total | 230.0 parts |

Preparation:

The mixture of the active ingredient and the magnesium stearate was granulated with an aqueous solution of the soluble starch, and the granulate was dried and intimately admixed with the lactose and the corn starch. The mixture was then compressed into tablets, each weighing 230 mgm. Each tablet contained 100 mgm of the 1-phenyl-3-hydroxy-3-methyl-triazene compound and was an oral dosage unit composition with effective immunosuppressant activity.

Analogous results are obtained when any one of the other compounds embraced by formula I is substituted for the particular 1-phenyl-3-hydroxy-3-methyl-triazene in Examples 9 and 10. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. A compound of the formula

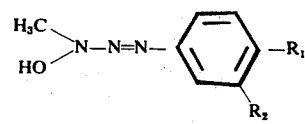

wherein $R_1$ is carbamoyl, N-lower alkyl-carbamoyl, lower alkoxy-carbonyl or cyano, and $R_2$ is hydrogen or methyl.

2. The compound of claim 1, which is 1-[p-(N-isopropyl-carbamoyl)-phenyl]-3-hydroxy-3-methyl-triazene.

3. The compound of claim 1, which is 1-[p-carbamoyl-m-methyl-phenyl]-3-hydroxy-3-methyl-triazene.

4. The compound of claim 1, which is 1-[p-cyano-phenyl]-3-hydroxy-3-methyl-triazene.

5. The compound of claim 1, which is 1-[p-carbamoyl-phenyl]-3-hydroxy-3-methyl-triazene.

* * * * *